US009671001B2

(12) United States Patent
Schrader et al.

(10) Patent No.: US 9,671,001 B2
(45) Date of Patent: Jun. 6, 2017

(54) RE-ENFORCES ITC PUMP

(71) Applicant: Schaeffler Technologies GmbH & Co. KG, Herzogenaurach (DE)

(72) Inventors: Scott Schrader, Canton, OH (US); Alfredo Jimenez, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 149 days.

(21) Appl. No.: 14/546,641

(22) Filed: Nov. 18, 2014

(65) Prior Publication Data

US 2015/0152950 A1     Jun. 4, 2015

Related U.S. Application Data

(60) Provisional application No. 61/910,649, filed on Dec. 2, 2013.

(51) Int. Cl.
*F16D 33/00*     (2006.01)
*F16H 45/02*     (2006.01)

(52) U.S. Cl.
CPC ..... *F16H 45/02* (2013.01); *F16H 2045/0278* (2013.01); *F16H 2045/0289* (2013.01)

(58) Field of Classification Search
CPC .. F16H 45/02; F16H 2045/0289; F16H 33/00; F16H 2045/0205; F16H 2045/0263; F16H 2045/0284
See application file for complete search history.

(56) References Cited

U.S. PATENT DOCUMENTS

| | | | |
|---|---|---|---|
| 6,406,262 B1 | 6/2002 | Kundermann | |
| 8,167,103 B2* | 5/2012 | Uhler | F16H 45/02 192/3.25 |
| 8,568,276 B2* | 10/2013 | Tsuzuki | F16H 61/62 477/168 |
| 2008/0149441 A1* | 6/2008 | Sturgin | F16H 45/02 192/3.25 |
| 2013/0230385 A1* | 9/2013 | Lindemann | F16D 33/18 415/122.1 |

* cited by examiner

*Primary Examiner* — David J Hlavka
(74) *Attorney, Agent, or Firm* — Simpson & Simpson, PLLC

(57) ABSTRACT

The present invention is a clutch plate attached to the inner surface of the impeller and/or turbine of a torque converter. The clutch plate supports friction material that enables the engagement of the turbine and impeller in the form of a turbine clutch. The clutch plate acts to relieve strain on the impeller shell when engagement occurs. In addition, the clutch plate provides an enlarged vertical surface to hold additional friction material.

18 Claims, 8 Drawing Sheets

RE-ENFORCES ITC PUMP

CROSS-REFERENCE TO RELATED APPLICATIONS

This application claims the benefit under 35 U.S.C. §119(e) of U.S. Provisional Patent Application No. 61/910,649, filed Dec. 2, 2013, which application is incorporated herein by reference in its entirety.

FIELD OF THE INVENTION

The present invention pertains to the field of torque converters, particularly to lockup clutches in torque converters, and more particularly to turbine clutches.

BACKGROUND OF THE INVENTION

Turbine clutches are used in torque converters as a type of lock-up clutch. Turbine clutches comprise a turbine and a pump in a typical torque converter assembly in which the assembly includes components and processes to engage the turbine and pump in lockup mode similar to the engagement of a separate lockup clutch used to bring the turbine and pump into a common rotation with an engine. Turbine clutches have the advantage of removing the separate lockup clutch from the torque converter assembly which allows for reduced space requirements for the torque converter. In addition, costs are lowered as fewer components are needed and fewer assembly steps are required to assemble the torque converter.

However, it has been found that utilizing the pump as a component of a turbine clutch puts excessive strain on the pump shell itself, especially proximate to the edge of an inner shoulder of the pump impeller. In addition, because the edge of the pump facing the turbine is typically much smaller than the friction bearing surface of a separate lockup clutch, there is less surface area to hold the friction material that can be used for clutch engagement.

U.S. Pat. No. 6,406,262 to Kundermann addresses the issue of holding the vanes of the pump impeller in place using a retaining ring. However, Kundermann fails to address the strain places on an impeller while is in a lockup engagement with a turbine. In addition, Kundermann makes no specific mention of a turbine clutch or the effects of the turbine clutch on the impeller itself.

Thus, there is a need in the field for a component or method that relieves the strain placed on the impeller of a torque converter arranged to include the turbine-impeller engagement features found in a turbine clutch.

SUMMARY OF THE INVENTION

The present invention broadly comprises a pump-clutch assembly for a torque converter comprising: a turbine, a torque converter pump, the torque converter pump including: a shell having an inner surface and an outer surface with a plurality of blades attached to the inner surface and a clutch plate having an inner face and an outer face. The inner face faces the inner surface of the pump and is attached to the pump shell at a first attachment point. In a preferred embodiment the clutch plate is L-shaped and comprises a long arm and a short arm, with the short arm having a terminal edge that is attached to the inner surface to form a second attachment point. A preferred method of attaching the clutch plate to the turbine shell is brazing.

One object of the invention is to present a turbine clutch with reduced strain on the pump impeller.

A second object of the invention is to supply a turbine clutch with increased friction material surface area.

A third object of the invention is to provide a torque converter having a turbine clutch that requires reduced manufacturing steps and costs.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims. Although any methods, devices or materials similar or equivalent to those described herein can be used in the practice or testing of the invention, the preferred methods, devices, and materials are now described.

Figure 1:
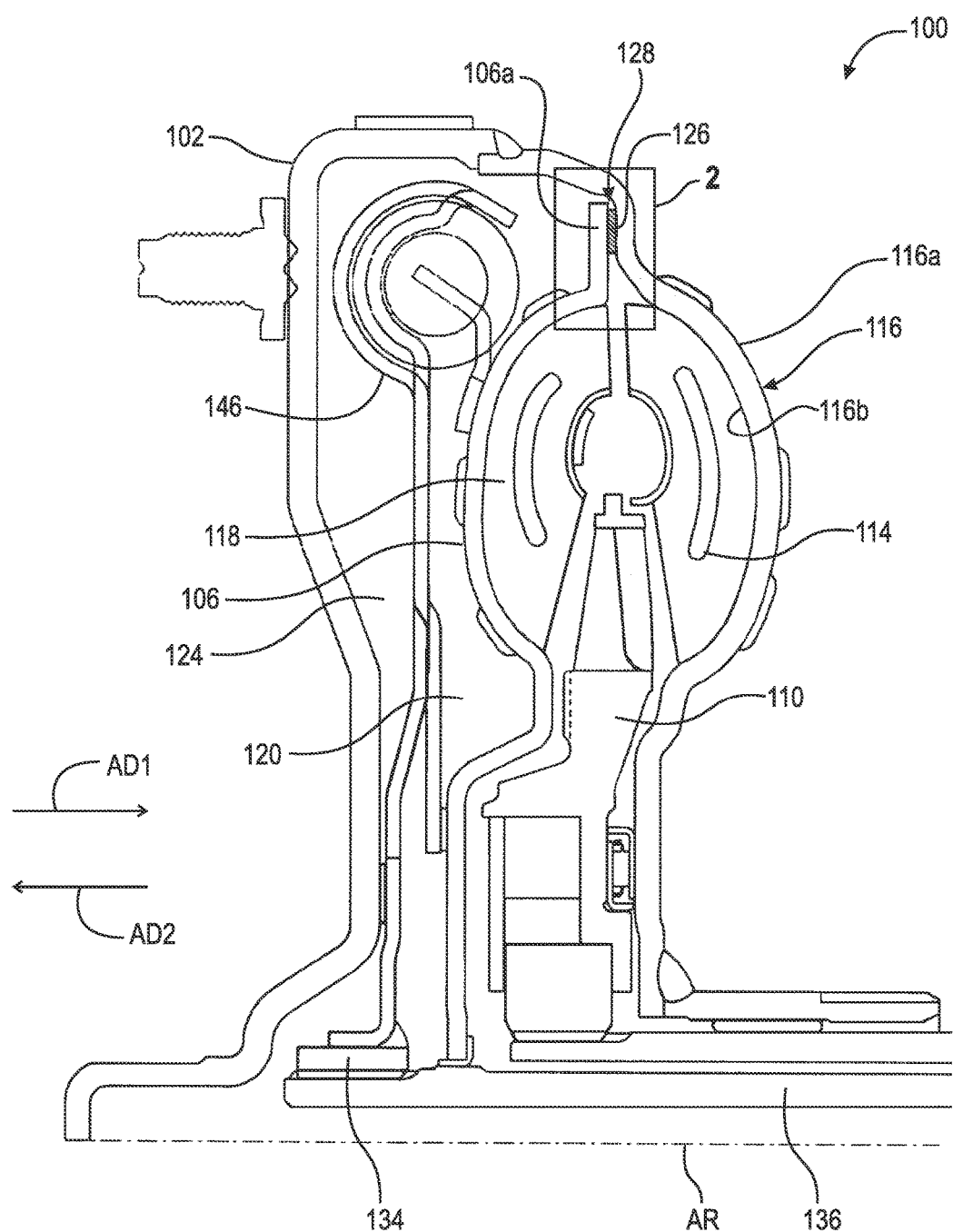
FIG. 1 is partial cross-sectional view of the a torque converter and turbine clutch of the prior art.

Adverting to the figures, FIG. 1 is partial cross-sectional view of multi-function torque converter 100 ("converter 100"). Multi-function torque converter 100 includes axis of rotation AR, cover 102, impeller or pump 116, turbine 106, stator 110 and turbine clutch 128. Cover 102 is arranged to receive torque from an engine or other force input device. Impeller 116 includes outer surface 116a and inner surface 116b and at least one impeller blade 114 connected to inner surface 116b. Turbine 106 includes at least one turbine blade 118 connected to turbine 106. Converter 100 includes pressure chamber 120 that is at least partially formed by the outer surface of turbine 106 and damper 146, pressure chamber 122 at least partially formed by impeller 116 and turbine 106, and pressure chamber 124 at least partially formed by damper 146 and cover 102. Impeller clutch 128 includes turbine region 106a, region 116c of the impeller shell and friction material 126. Damper 146 is arranged to urge turbine shell 106 in axial direction AD1 and output hub 134 is arranged to non-rotatably connect to input shaft 136 for a transmission.

Figure 2:
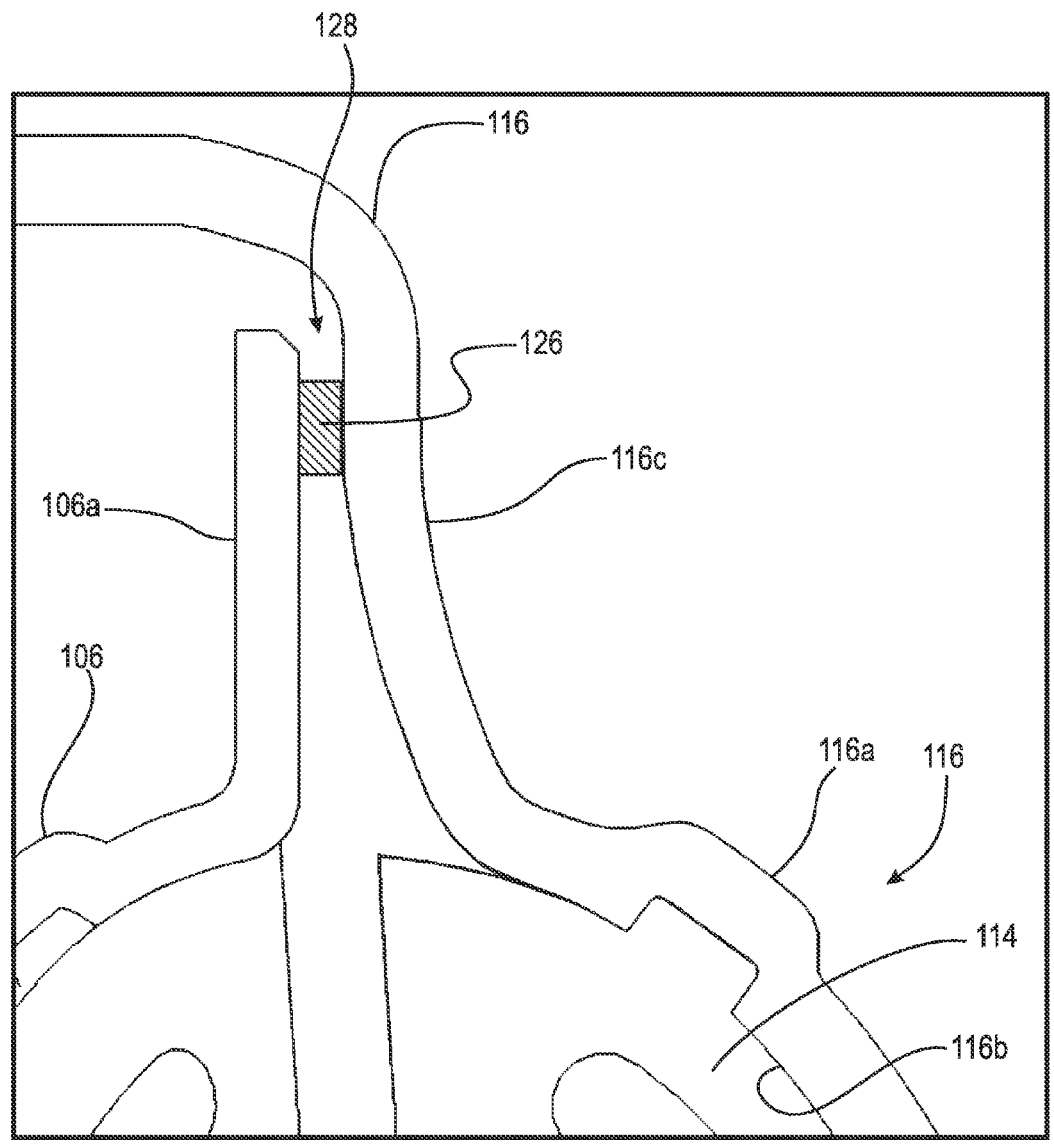
FIG. 2 is an enlarged view of a portion of the torque converter showing the region where the turbine clutch engages the turbine.

FIG. 2 is an enlarged view of area 2 in FIG. 1 showing the region where clutch 128 is formed by pump clutch region 116c and turbine clutch region 106a. Friction material 126 is attached to inner surface 116b of impeller 116. In can be seen that the inner vertical facing of inner surface 116b in clutch area 116c that can support friction material is reduced thereby reducing the area that can provide friction engagement in turbine clutch 108. The inner surface of region 106a may also hold friction material.

Figure 3:
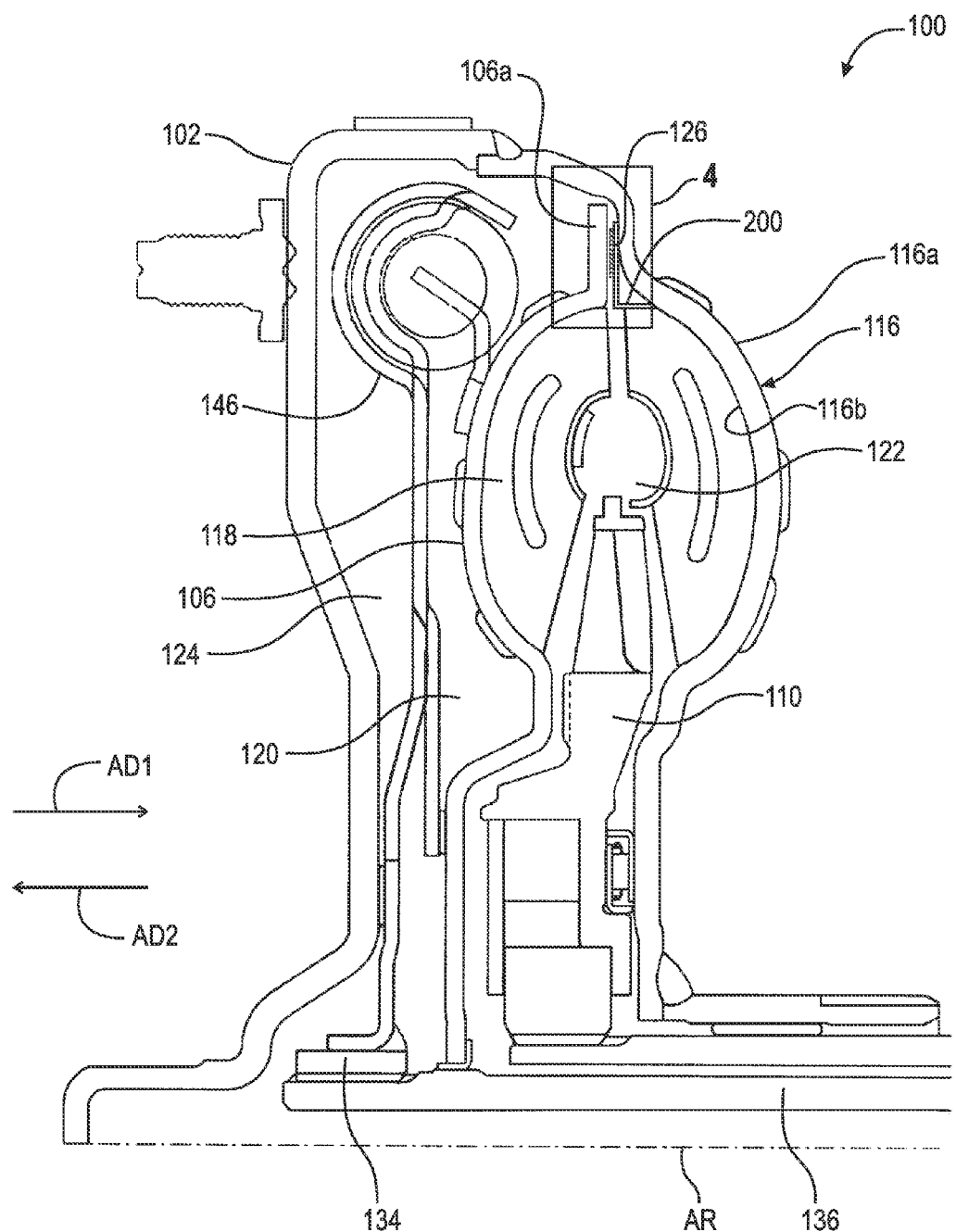
FIG. 3 is a partial cross section view of the torque converter of the present invention to include a clutch plate attached to the impeller.
Figure 4:
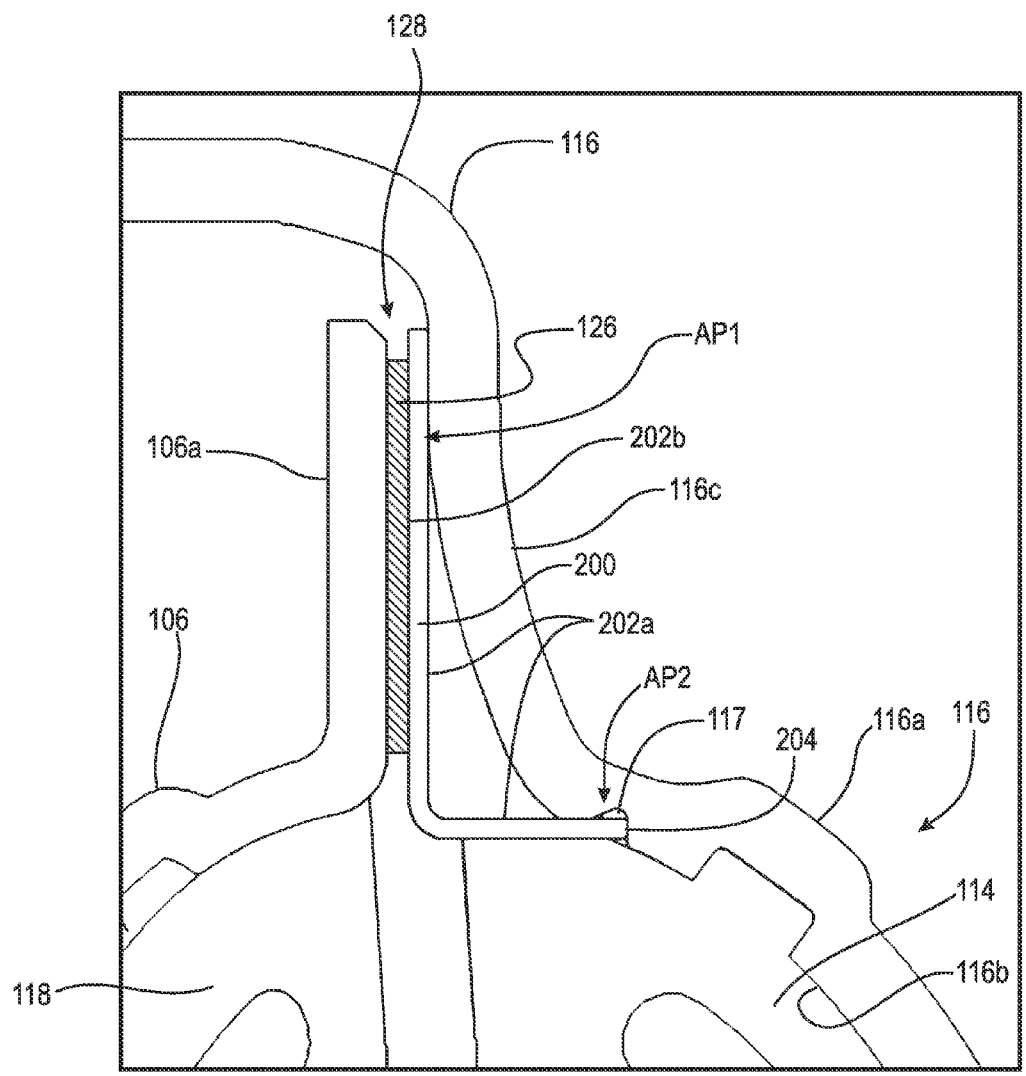
FIG. 4 is an enlarged view of the portion seen in FIG. 3 with the clutch plate attached to the inner surface of the impeller of the torque converter.

FIG. 3 is a partial cross section view of torque converter 100 including clutch plate 200 attached to impeller 116 as shown. FIG. 4 is an enlarged view of the area 4 seen in FIG. 3 with clutch plate 200 attached at attachment points AP1 and AP2 to inner surface 116b of impeller 116 at clutch area 116c. Clutch plate 200 includes inner face 202a facing inner surface 116b with outer clutch plate face 202b facing turbine 106. Friction material 126 is attached to outer face 202b. FIG. 4 shows a preferred embodiment in which clutch plate 200 is L-shaped with terminal edge 204 fitting into slot 117 for support for the short arm. Terminal edge 204 is the edge of the short arm of clutch plate 200 that fits into slot 117.

Figure 5:
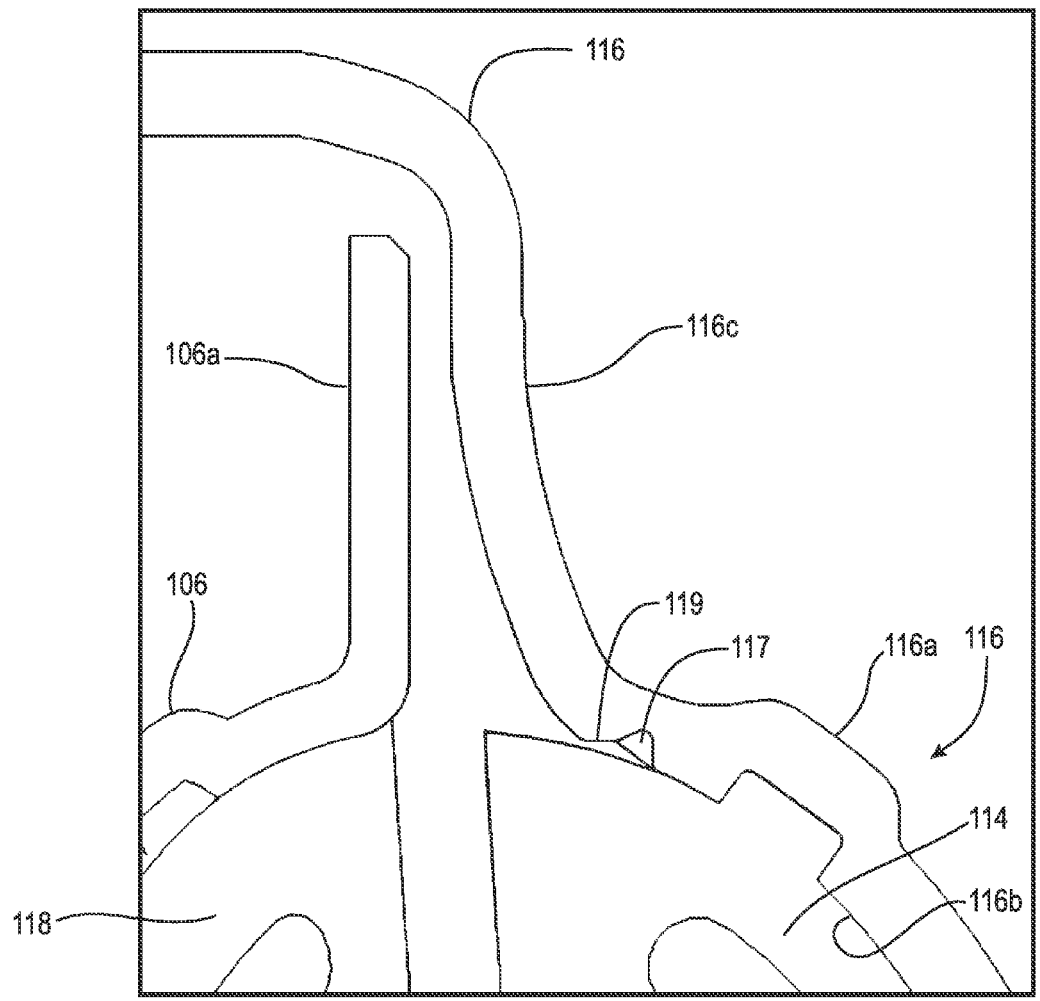
FIG. 5 is an enlarged view similar to FIG. 2 showing an alternate embodiment of the inner surface of the impeller; and, FIG. 6 is an enlarged view of the turbine clutch showing the attachment of the clutch plate to the inner surface of impeller seen in FIG. 5.

FIG. 5 is the same enlarged view as FIG. 2 showing an alternate embodiment of the inner surface of the impeller that can be used for attachment of plate 200 to inner surface 116b. In the alternate embodiment, inner surface 116b includes undercut 119. Undercut 119 is a flattened segment of inner surface 116b positioned to contact flat inner face 202a of the short arm of L-shaped clutch plate 200. By contacting inner surface 116b, undercut 119 provides additional support for clutch plate 200 near the lower attachment point AP2 relieving strain on the braze or weld attachment point AP2.

Figure 6:
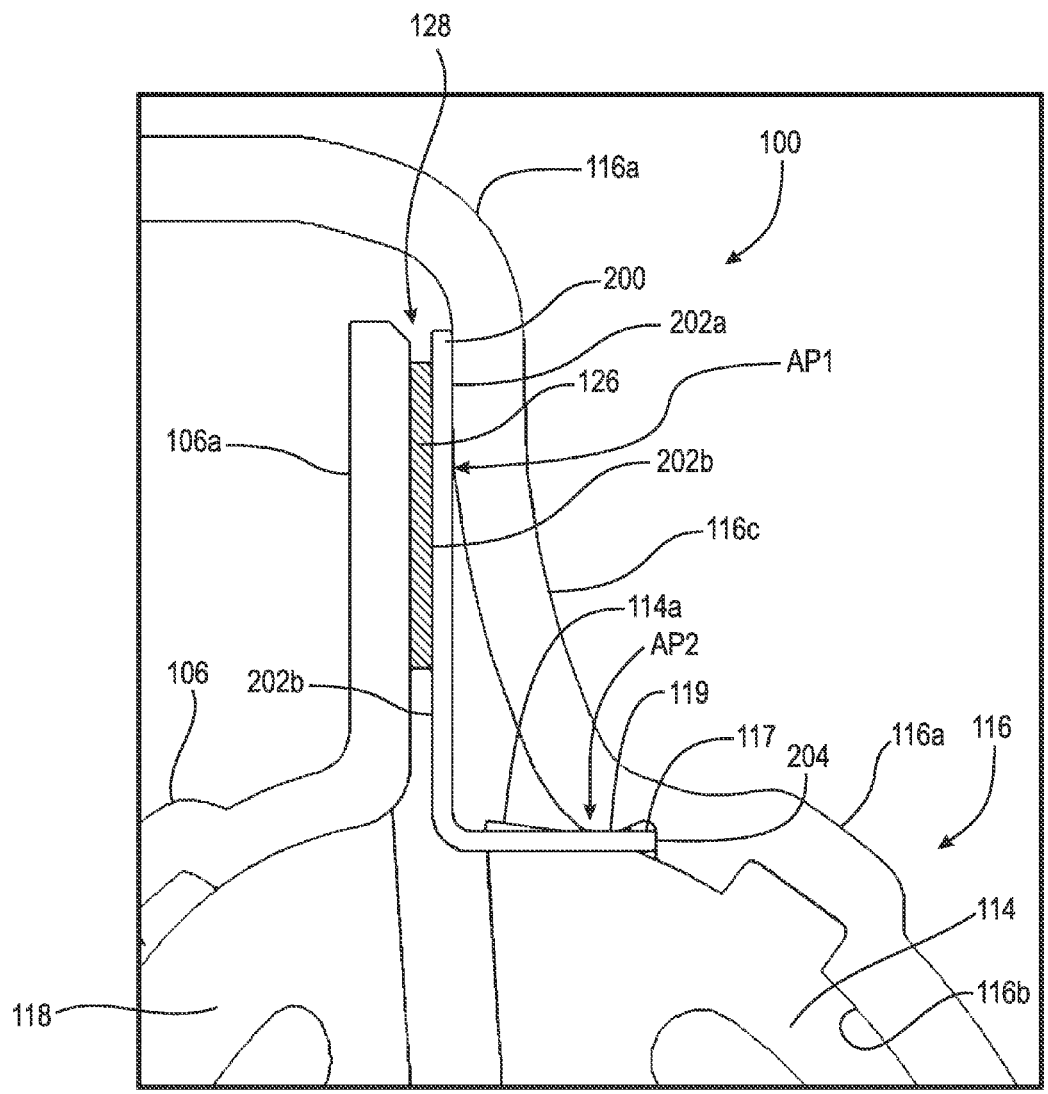

FIG. 6 is the same enlarged view as seen in FIG. 4 depicting the alternate embodiment for attachment of clutch plate 200 to impeller 116. In this preferred second alternate embodiment, the short arm of L-shaped clutch plate 200 defines a slot to provide space for upper portion 114a of impeller blade 114 to extend above the short arm. This provides the advantage of not altering the shape of impeller blade 114 to retain the same or similar fluid flow pattern with clutch plate 200 attached to impeller 116 as when clutch plate 200 is not attached. A second advantage with the use of the slot in the short arm is the lateral support provided to blade 114 by the short arm of clutch plate 200 when upper portion 114a is extended into or through that slot.

Clutch plate 200 may be attached at attachment points AP1 and AP2 by welding, rivets, adhesives, brazing or other appropriate means know to those having skill in the art. In a preferred embodiment, clutch plate 200 is applied by brazing. Brazing, for example with copper or copper alloy filler material, may have the advantage of being cheaper and more efficient when that material is used in other steps in the manufacturing process.

Figure 7:
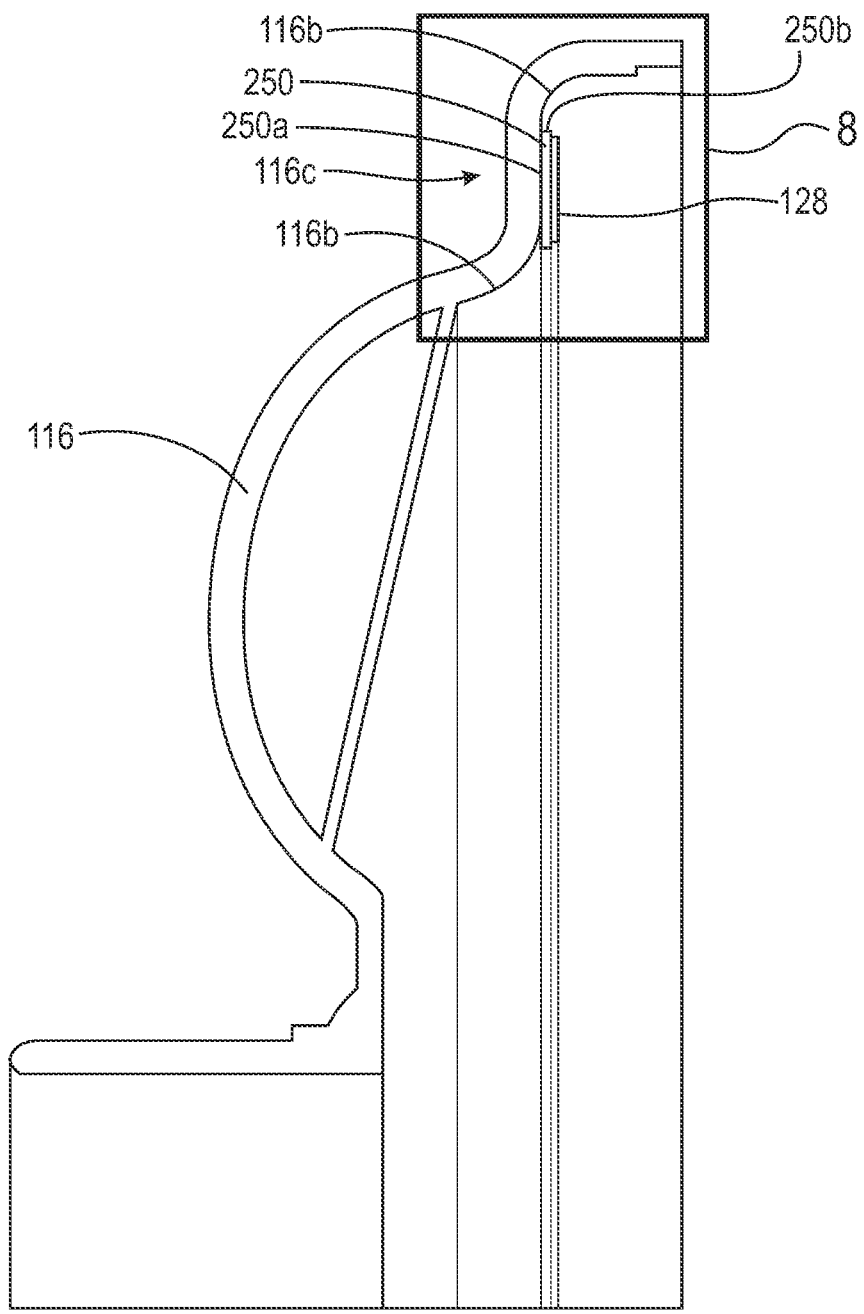
FIG. 7 is a partial cross section view of impeller 116 depicting an alternate embodiment of the invention; and, FIG. 8 is an enlarged view of circled area 8 seen in FIG. 7 with the alternate embodiment of the clutch plate attached to the impeller.
Figure 8:
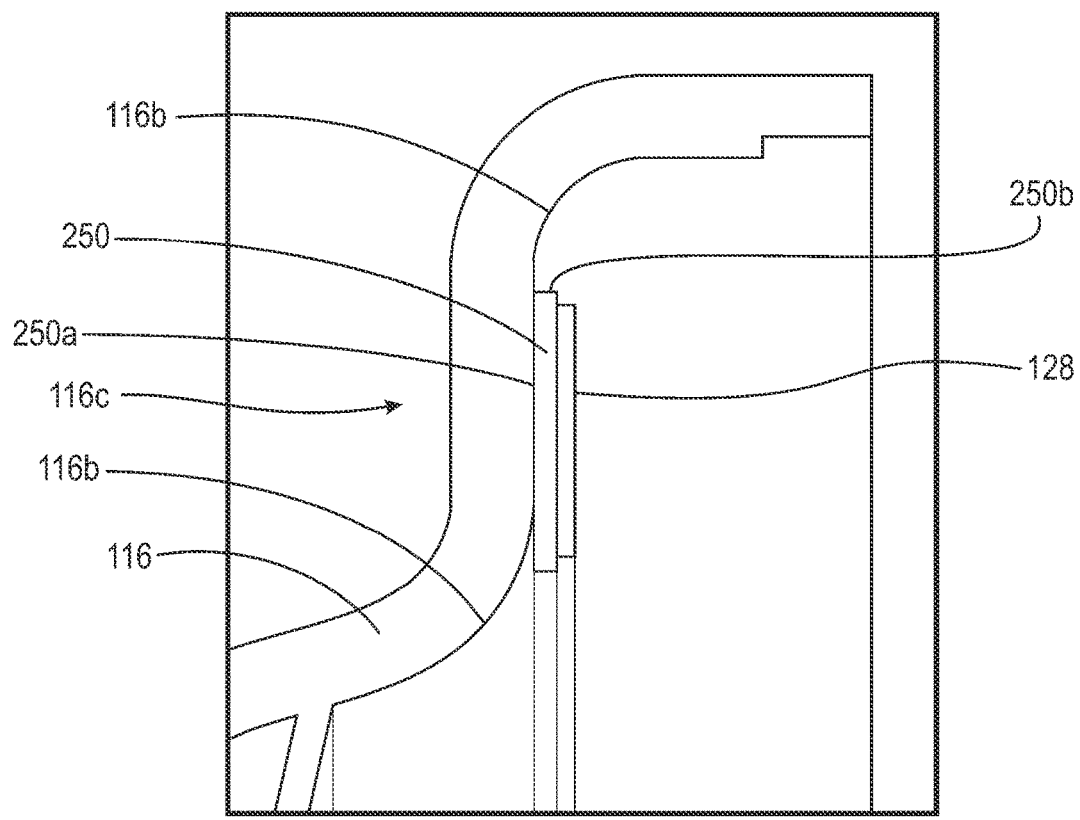

FIG. 7 is a partial cross section view of impeller 116 depicting an alternate embodiment of the invention. FIG. 8 is an enlarged view of circled area 8 seen in FIG. 7. Inner impeller surface 116b in pump clutch region 116c includes a longer vertical inner surface than seen in the embodiments discussed above. For this reason, ring-shaped clutch plate 250 includes a vertical surface attached to inner impeller surface 116b. The longer vertical inner surface 116b within pump clutch region 116c provides increased support for inner clutch plate inner face 252a compared to the embodiments discussed above. This enables clutch plate 250 to be adequately supported by pump clutch region 116c without the additional support from outside pump clutch region 116c required by impellers with shorter vertical inner surfaces that use L-shaped clutch plate 200 as seen in FIGS. 3-6 discussed above. Friction material 128 is attached to outer plate surface 252b. Clutch plate 252 may be attached to inner surface 116b by brazing or welding similar attachment point AP1 discussed above. It would be routine for persons of skill in the art to determine the number of attachment points AP1 that will be needed to attach plate 252 to inner surface 116b.

One advantage of this embodiment is that clutch plate 252 may not extend into the interior of impeller 116 where fluid flow is directed from impeller 116 to turbine 106. For this reason, it is not necessary to alter the structure of plate 252 to accommodate the presence of impeller blades 114. This advantage will allow for the creation of a fluid coupling that is influenced only by impeller blades 114, turbine blades 118, and stator 110 (if present) and not impeded by an additional component, namely an impeller clutch plate.

When turbine clutch 128 is disengaged, the fluid pressure in chambers 120, 122, and 124 are substantially equal meaning the pressure differential among the three chambers is sufficiently low to restrict axial movement of turbine 106 and impeller 116. Axial movement of turbine 106 in direction AD1 is effected by increasing fluid pressure in chamber 120 while draining fluid out to of chamber 122 as shown by the arrows in FIG. 1. Alternatively, the pressure in chamber 124 may be increased over chamber 120 which is itself greater than chamber 120. This will also move turbine 106 into engagement with friction material 126 to place clutch 128 into lockup mode. The axial movement causes turbine region 106a move into engagement with friction material 126 to form the lockup configuration of clutch 128. As seen in FIGS. 4-6, clutch plate 200 provides an increase in surface area to allow more friction material 126 to be available for engagement making the clutch lockup more secure. Similar use of pressure differentials in chamber 120, 122, and 124 can be used to move turbine 106 toward clutch plate 250 to form the lockup configuration of clutch 128.

Thus it is seen that the objects of the invention are efficiently obtained, although changes and modifications to the invention should be readily apparent to those having ordinary skill in the art, which changes would not depart from the spirit and scope of the invention as claimed.

We claim:

1. A pump-clutch assembly for a torque converter comprising:
 a turbine;
 a torque converter pump, said torque converter pump including:
  a shell, said shell having an inner surface and an outer surface; and,
  a plurality of blades attached to said inner surface;
 a clutch plate having an inner face and an outer face; and,
 friction material attached to an inner turbine surface, the inner turbine surface facing said clutch plate outer face;
 wherein said inner face faces said inner surface and is attached to said inner surface of said pump shell to form a first attachment point.

2. The pump-clutch assembly as recited in claim 1 wherein said attachment of said inner face of said clutch plate and said inner surface of said pump shell is by brazing.

3. The pump-clutch assembly as recited in claim 1 further comprising friction material attached to at least a portion of said outer face.

4. The pump-clutch assembly as recited in claim 1 wherein said clutch plate is L-shaped and comprises a long arm and a short arm, said short arm having a terminal edge wherein said terminal edge is attached to said inner surface forming a second attachment point.

5. The pump-clutch assembly as recited in claim 4 wherein said shell includes a cutout on said inner surface and said terminal edge fits into said cutout.

6. The pump-clutch assembly as recited in claim 5 wherein said cutout includes an undercut wherein at least a portion of said inner surface of said short arm contacts said undercut.

7. The pump-clutch assembly as recited in claim 4 wherein said attachment of said of said inner face of said clutch plate and said inner surface of said pump shell is by brazing.

8. The pump-clutch assembly as recited in claim 4 wherein said attachment of said terminal edge to said inner surface of said shell is by brazing.

9. The pump-clutch assembly as recited in claim 4 wherein said short arm defines a slot and wherein one of said plurality of blades extends into said slot.

10. The pump-clutch assembly as recited in claim 2 further comprising friction material attached to at least a portion of said outer face.

11. A torque converter comprising:
 a turbine;
 a stator;
 a torque converter pump, said torque converter pump including:
  a shell, said shell having an inner surface and an outer surface; and,
  a plurality of blades attached to said inner surface;
 a clutch plate having an inner face and an outer face; and,
 friction material attached to an inner turbine surface, the inner turbine surface facing said clutch plate outer face;
 wherein said inner face faces said inner surface and is attached to said inner surface of said pump shell to form a first attachment point.

12. The pump-clutch assembly as recited in claim 11 wherein said attachment of said inner face of said clutch plate and said inner surface of said pump shell is by brazing.

13. The pump-clutch assembly as recited in claim 11 further comprising friction material attached to at least a portion of said outer face.

14. The torque converter as recited in claim 11 wherein said clutch plate is L-shaped and comprises a long arm and a short arm, said short arm having a terminal edge wherein said terminal edge is attached to said inner surface forming a second attachment point.

15. The torque converter as recited in claim 14 wherein said shell includes a cutout on said inner surface and said terminal edge fits into said cutout.

16. The torque converter as recited in claim 15 wherein said cutout includes an undercut wherein at least a portion of said inner surface of said short arm contacts said undercut.

17. The torque converter as recited in claim 14 wherein said short arm defines a slot and wherein one of said plurality of blades extends into said slot.

18. The torque converter as recited in claim 14 further comprising friction material attached to at least a portion of said outer face.

* * * * *